L. P. PATTERSON.
WELDED JOINT AND METHOD OF WELDING.
APPLICATION FILED DEC. 9, 1918.
1,337,023.
Patented Apr. 13, 1920.
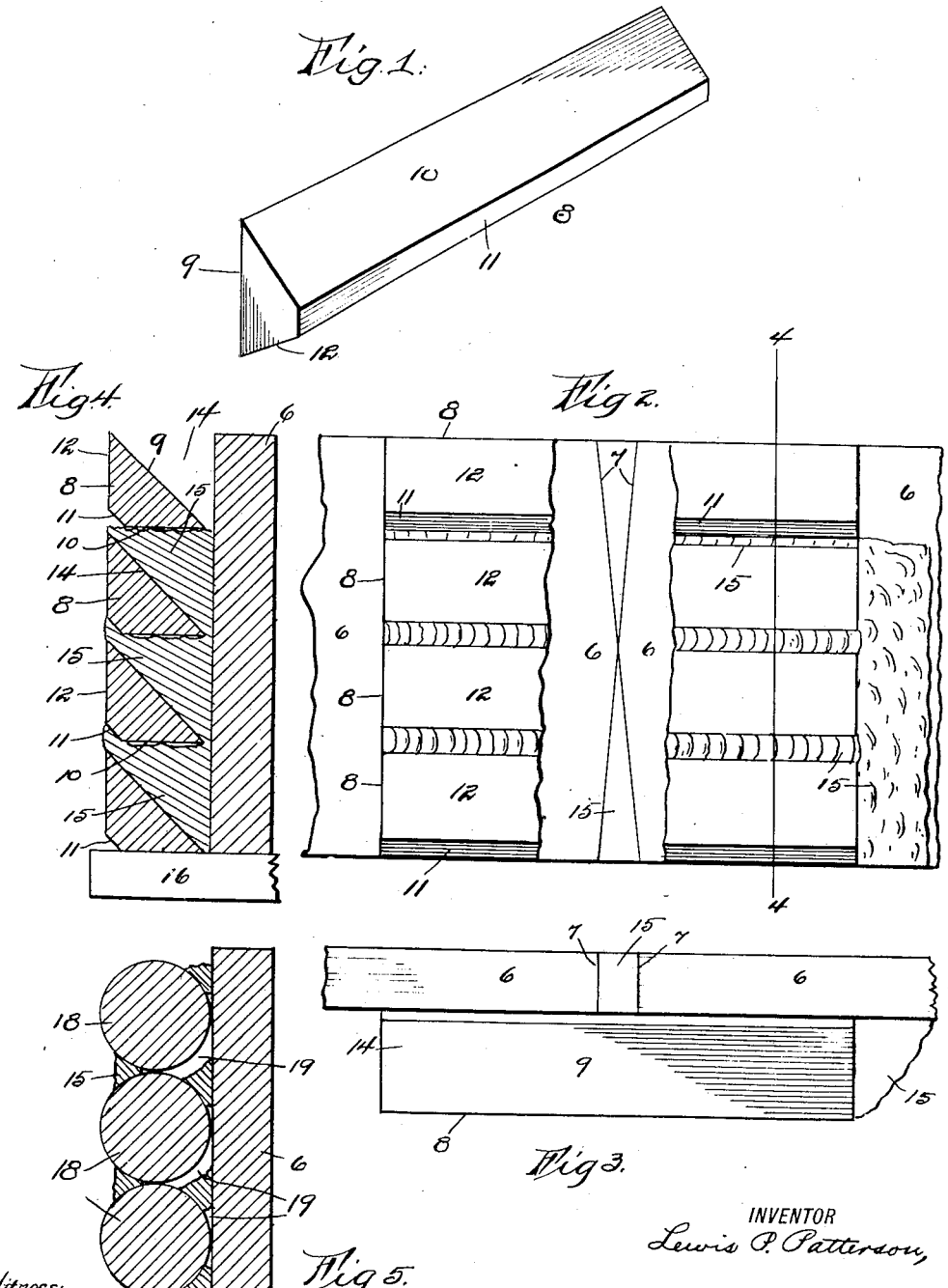

UNITED STATES PATENT OFFICE.

LEWIS PRESTON PATTERSON, OF KANSAS CITY, KANSAS.

WELDED JOINT AND METHOD OF WELDING.

1,337,023.  Specification of Letters Patent.  Patented Apr. 13, 1920.

Application filed December 9, 1918. Serial No. 266,017.

*To all whom it may concern:*

Be it known that I, LEWIS PRESTON PATTERSON, a citizen of the United States, and resident of Kansas City, county of Wyandotte, and State of Kansas, have invented certain new and useful Improvements in Welded Joints and Methods of Welding, of which the following is a complete specification.

The present invention relates to welding methods and structures, and aims to provide an improved means for welding fractured parts together and forming a reinforced joint between said parts by making use of tie rods or bars and applying the welding material in such a manner as to practically seal all the space between the parts comprising the joint.

Accordingly one of the objects of the invention is to provide a weld construction in which the parts comprising the tie or reinforcing elements are so constructed and arranged as to facilitate the application of the welding material into substantially all the spaces between the parts comprising the joint and thereby secure a complete and intimate union of the parts in this welded and reinforced relation.

It is also sought to provide a weld construction of this character which is not only more practical and efficient but which may be produced more readily in actual practice and is also characterized by a neater and smoother and more workmanlike appearance than is the usual form of joint which is produced by electric welding means employing reinforcing elements.

With these general objects in view the invention will now be described with reference to the accompanying drawing illustrating a form of construction which has been devised for embodying the proposed improvements, after which the novel features therein will be particularly defined in the appended claims.

In the drawing—

Figure 1 is a perspective view of one of the tie bar or reinforcing members;

Fig. 2 is an elevation showing a broken face view of a weld structure fashioned according to the present invention, the welding of the upper tie member being left incomplete;

Fig. 3 is a plan view of the same;

Fig. 4 is a vertical section taken on the line 4—4 of Fig. 2; and

Fig. 5 is a similar sectional view illustrating an old form of weld joint which it is the purpose of the present invention to improve.

Referring to the drawing in detail, the same illustrates two parts 6, 6, such as the fractured parts of an engine frame or other structure, which it is desired to weld together in a reinforced manner, the lines 7, 7, representing surfaces of said parts prepared for welding. For forming a reinforced joint between the parts 6, 6, I apply a series of tie or reinforcing bars 8 of appropriate length and each having three principal side faces, including a wide face 9 and two narrower faces 10, 12, at right angles to each other and connected by a still narrower face 11 extending parallel to the wide face 9. This provides a bar of general trapezoidal section, which is adapted to be positioned transversely of the lines 7, 7, with the wide face 9 extending at an inclination to the face of the work (*i. e.*, the parts being welded), and the face 10 at right angles to said work; the side face 12 forming the exterior face of the joint. This provides a space 14 between the reinforcing bar and the work which tapers downwardly from top to bottom, and since in applying the bar 8 into position its lower edge is left slightly out of contact with the work, as illustrated in Fig. 4, the application of the welding material 15 (which it is preferred to do by the electric arc welding method) is greatly facilitated and may readily be carried out so as to fill substantially the entire space 14.

In assembling the parts comprising the joint in accordance with the improved method, I start at the base of the fracture by positioning the lowermost tie bar 8 opposite the work and slightly out of contact therewith as illustrated in Fig. 4, a suitable carbon or brass support 16 being used for supporting the parts in this relation, after which the welding material is applied (preferably by the electric arc method) to fill the space 14 between the lowermost bar 8 and the work. The next upper bar 8 is similarly placed in position parallel to the first bar 8 and the welding material applied in the same manner, and so on, with the succeeding bars, one above the other, the result being a continuous integral mass of the welding material which intimately connects said bars with the work by filling all the spaces between said bars and the work in a substantially unbroken manner and also leaving as little broken or unfilled spaces as is practicable along the lower faces 10 of the bars. Of course if a more or less flexible joint should be desired, the bars 8 may be spread apart sufficiently for this purpose, but in case a perfectly rigid joint is to be obtained, they will be set fairly close together and the spaces opposite the faces 11 filled in with the welding material, as is illustrated in the case of the intermediate bars 8 in Figs. 2 and 4, this also resulting in a smoother finished joint structure. Again the welding material may, if desired, be filled in at the ends of the series of bars 8 as illustrated at the right in Figs. 2 and 3, for increasing the strength and rigidity of the joint as well as improving its finish.

It is thus apparent that a practical and efficient welding method and structure are provided for carrying out the desired objects of the invention. With means heretofore used, a more or less broken or interrupted weld structure was obtained, as illustrated in the view shown in Fig. 5, where round tie rods are used for reinforcing the joint. When this type of reinforcing bar is used, the quick cooling character of the welding material is such as to prevent its finding its way into the smaller restricted spaces between the rods and between the rods and work, because the said welding material congeals so rapidly and immediately stops flowing. As a consequence, the rods are only indifferently connected with each other and with the parts of the fracture, on account of the broken and irregular character of the weld due to the gaps thus formed, as indicated at 19, and the result is a much less securely welded structure. The present improvements overcome such difficulties, in view of the fact that the welding material is allowed to reach all points on the surface of the work, and as little space as possible between the bars is left unfilled. Furthermore, the welding material is much more quickly applied, by virtue of the shape or contour of the spaces 14; and again, the weld is made continuous, on account of the fact that the spaces 14 communicate with each other by passages sufficiently ample to prevent the congealing of the material before the mass of welding material is intimately united. The shape of the bars 8, including the inclined face 11, intermediate the faces 10 and 12, is also such that the relative distances between the bars may be varied according to the amount of welding material desired to be used, it being possible to bring the said bars closer together than illustrated with the lower face 10 of each bar below the level of the upper corner of the next lower bar, while still maintaining the outer faces 12 of the bars in the same vertical plane. By this means the strength and rigidity of the joint may also be varied in accordance with the requirements. An additional advantage also lies in the provision of a tie or reinforcing bar made up of plain flat faces from which rust and scale may readily be removed by means of a file or emery wheel in preparing the same for use.

While I have illustrated what is now regarded as the preferred mode of carrying the invention into practice, I desire to reserve the right to make such formal changes as may fairly fall within the scope of the appended claims.

What I claim is:

1. A welded joint comprising a tie or reinforcing member spanning the fractured parts, said member having that side which faces the fractured parts formed as a substantially flat surface arranged at an incline to said fractured parts, and welding material substantially filling the space between said parts and member.

2. A welded joint comprising a tie or reinforcing member spanning the fractured parts, said member having two welding faces, one extending at right angles to said fractured parts and another facing said fractured parts and forming a substantially flat surface arranged at an inclination to said parts, and welding material substantially filling the space between said parts and the inclined face of said member.

3. A welded joint comprising a tie or reinforcing member spanning the fractured parts, said member having three principal faces, one face extending at right angles to said fractured parts and another parallel thereto, and a third face forming a substantially flat surface arranged at an inclination to said parts, and welding material substantially filling the space between said parts and the inclined face of said member.

4. A welded joint comprising a tie or reinforcing member spanning the fractured parts, said member having that side which faces the fractured parts formed as a substantially flat surface arranged at a downward inclination with reference to said fractured parts, said member being spaced slightly out of contact with said parts, and welding material substantially filling the space between said parts and member.

5. A welded joint comprising a plurality of tie or reinforcing members spanning the fractured parts in parallel relation and spaced slightly apart and out of contact with said fractured parts, each of said members having two flat faces, one extending at right angles to said fractured parts and another facing said fractured parts and forming a substantially flat surface arranged at an inclination to said parts, and welding material filling the spaces between said parts and the inclined faces of said members.

6. A welded joint comprising a plurality of tie or reinforcing members spanning the fractured parts in parallel relation and spaced slightly apart and out of contact with said parts, each of said members having three principal faces, one extending at right angles to said fractured parts and another facing said parts and forming a substantially flat surface arranged at an inclination to said parts, and welding material filling the spaces between said parts and the inclined faces of said members.

7. A welded joint comprising a plurality of tie or reinforcing members spanning the fractured parts in approximately parallel relation and spaced apart and slightly out of contact with said fractured parts, each of said members having three principal faces, one extending at approximately right angles to said fractured parts and another parallel thereto, and a third face forming a substantially flat surface arranged at an inclination to said fractured parts, and welding material filling the spaces between said parts and the inclined faces of said members, each of said members also having a minor inclined face intermediate said first mentioned faces for providing filling spaces for the welding material between the adjoining edges of said members.

8. A method of welding fractured parts which consists first in positioning a tie or reinforcing member having a substantially flat face across said fractured parts, and then filling in the welding material between said parts and member while maintaining the latter slightly out of contact with said parts and with the said flat face of the member presented toward said parts in inclined relation thereto.

9. A method of welding fractured parts which consists first in positioning a tie or reinforcing member having a substantially flat face across said fractured parts, then filling in the welding material between said parts and member while maintaining the latter slightly out of contact with said parts and with the said flat face of the member presented toward said parts in inclined relation thereto, then welding another similar member to said parts in juxtaposed relation to said first member but slightly out of contact therewith, and finally substantially filling the space between said members with the welding material.

LEWIS PRESTON PATTERSON.